(12) United States Patent
Klein et al.

(10) Patent No.: US 8,079,900 B2
(45) Date of Patent: Dec. 20, 2011

(54) HARVESTER WITH AN ADDITIONAL DRUM CONVEYOR FOR STRAW REMOVAL AND A SINGLE FLAP FOR CHANGING BETWEEN SWATH DEPOSIT AND CHOPPING OPERATION

(75) Inventors: Oliver Klein, Saarlouis (DE); Dirk Weichholdt, Woelfing les Sarreguerlines (DE); Rico Priesnitz, Lebach (DE); Fritz Lauer, Krähenberg (DE); Chad A. Dow, East Moline, IL (US); Joel D. Ferris, Davenport, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/665,733

(22) PCT Filed: Jul. 7, 2008

(86) PCT No.: PCT/EP2008/058741
§ 371 (c)(1),
(2), (4) Date: Dec. 21, 2009

(87) PCT Pub. No.: WO2009/015997
PCT Pub. Date: Feb. 5, 2009

(65) Prior Publication Data
US 2010/0184494 A1    Jul. 22, 2010

(30) Foreign Application Priority Data

Jul. 31, 2007  (DE) .......................... 10 2007 035 798
Apr. 29, 2008  (DE) .......................... 10 2008 001 460

(51) Int. Cl.
*A01F 12/30* (2006.01)
(52) U.S. Cl. ........................................ 460/111; 460/112
(58) Field of Classification Search .................. 460/111, 460/112
See application file for complete search history.

(56) References Cited

U.S. PATENT DOCUMENTS

| | | | |
|---|---|---|---|
| 7,063,613 B2 * | 6/2006 | Weichholdt ................... 460/112 |
| 7,066,810 B2 * | 6/2006 | Farley et al. .................. 460/112 |
| 7,648,413 B2 * | 1/2010 | Duquesne et al. ............ 460/112 |
| 7,717,779 B1 * | 5/2010 | Weichholdt et al. .......... 460/112 |
| 2004/0176150 A1 * | 9/2004 | Gryspeerdt et al. ........... 460/112 |

* cited by examiner

*Primary Examiner* — Alicia Torres

(57) ABSTRACT

A combine (10) comprises a crop processing device (26) having a straw outlet (62), a beater (64) assigned to the straw outlet (62) of the crop processing device (26) and a straw chopper (60). An overshot drum conveyor (68) follows the beater (64). A single, pivotable flap (80) is located downstream the drum conveyor (68) and movable between a chopping position in which it deflects the straw downward into the straw chopper (60) and a swath laying position in which it lets the straw pass to a slope (88) behind the straw chopper (60). The flap (80) is pivoted at its forward end adjacent and above the drum conveyor (68) and has a shape matching to the circumference of the drum conveyor (68).

7 Claims, 2 Drawing Sheets

Figure 1:
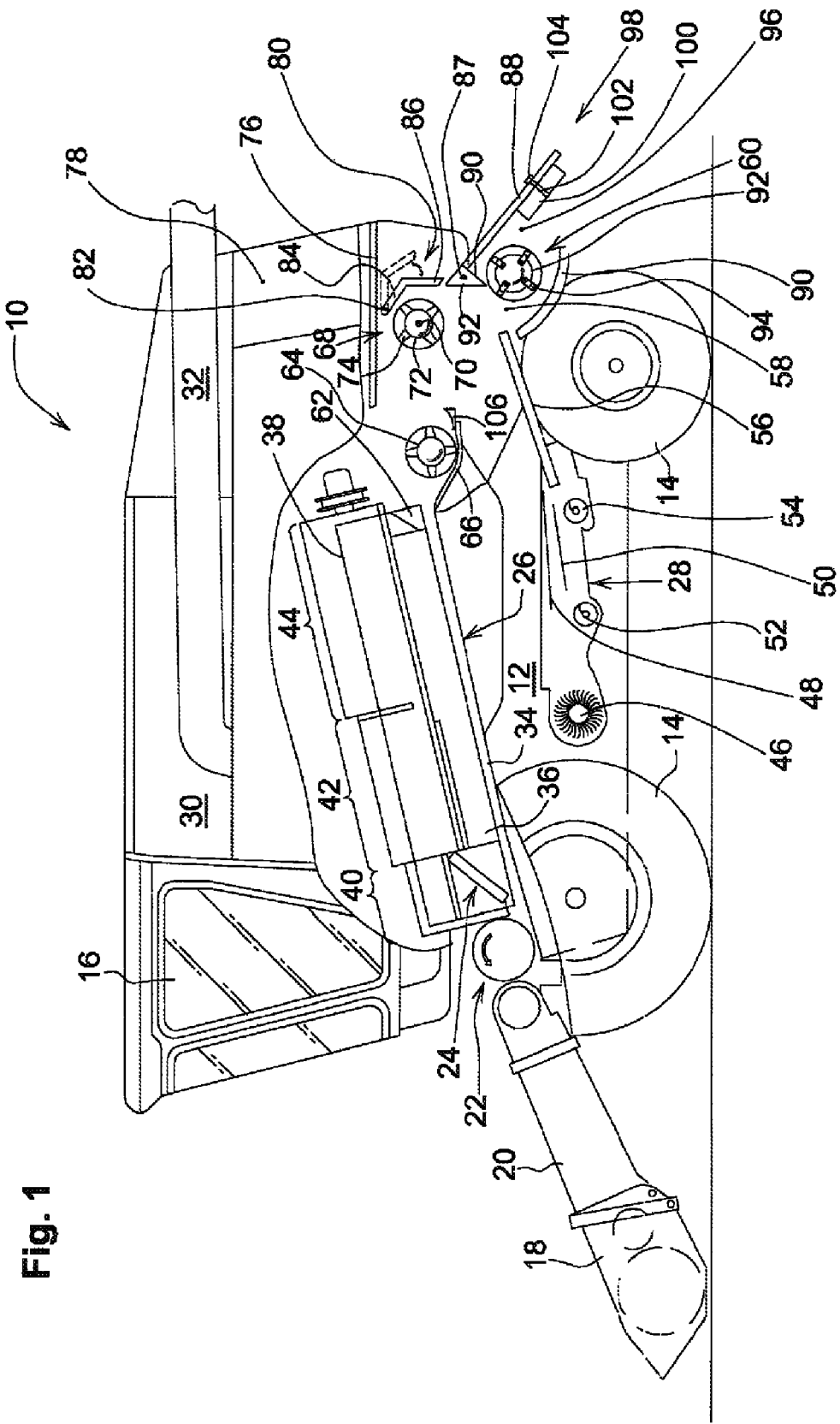

HARVESTER WITH AN ADDITIONAL DRUM CONVEYOR FOR STRAW REMOVAL AND A SINGLE FLAP FOR CHANGING BETWEEN SWATH DEPOSIT AND CHOPPING OPERATION

The invention relates to a harvester comprising:
a chassis, which can be moved across a field in a forward direction,
a crop processing device having an outlet for straw,
a rotatable ejector drum, which is associated with the outlet and discharges the straw rearwards in free flight,
a straw chopper with an inlet,
a further conveyor for conveying straw, which operates in an overshot manner and is arranged downstream of the ejector drum,
and a guiding device, which is arranged downstream of the further conveyor and upstream of the inlet of the straw chopper and which can be moved, by pivoting about an axis, into a chopping position, in which it deflects the straw downwards into the inlet of the straw chopper, and a swath deposit position, in which it allows the straw to pass through to a chute, which is arranged to the rear of the straw chopper and on which it reaches the ground.

PRIOR ART

Agricultural harvesters are large machines which harvest, thresh, separate and clean agriculturally cultivated grain-bearing crops. The clean grain obtained is stored in a grain tank arranged on the harvester. The straw removed by threshing is generally either chopped and distributed on the field across the width of the cutting section or is guided around the straw chopper and deposited on the field unchopped in a swath so that it can be picked up later by a baler. The crop residues remaining at the rearward outlet of the cleaning device, such as chaff and small pieces of straw, are distributed on the field by a chaff spreader or passed through the straw chopper and distributed on the field. The last-mentioned solution has the advantage that there is no need for a separate chaff spreader but makes it necessary to guide the straw past the rear of the straw chopper in the swath operating mode.

U.S. Pat. No. 7,066,810 B, which is regarded as defining the type in question, describes a harvester in which a conveyor belt operating in an overshot manner follows downstream of an ejector drum arranged to the rear of the outlet of an axial separating device. Guide plates are fitted at the rear end of the conveyor belt, forming a downward-facing shaft in the chopping mode and guiding the straw into the straw chopper, which is fitted below and to the rear of the rear end of the conveyor belt and which chops the straw and distributes it over the field. The crop residues from the cleaning operation are distributed over the field by means of a chaff spreader. The guide plates can furthermore be moved into a swath position, in which they open a rear passage, through which the straw reaches the field to the rear of the straw chopper. In the swath position, the guide plates close off the straw chopper at the top. Also provided is a position for distributing crop residues, in which the guide plate which forms the front wall of the shaft in the chopping position is pivoted obliquely rearwards, with the result that the material to be chopped passes downwards ahead of the straw chopper and is mixed there with chaff from the chaff spreader and deposited on the ground. Instead of the guide plate being pivoted, it is also possible for the conveyor belt to be pivoted about the axis of rotation of its front or rear return pulley into an approximately vertical position, in which it guides onto the ground the straw thrown against its front side by the ejector drum. Here, it must be regarded as a disadvantage that separate chaff spreaders are required and that a large number of moving parts are needed to implement the various operating modes.

OBJECT OF THE INVENTION

The underlying object of the invention is considered to be that of providing a harvester of the type stated at the outset in which the straw can be removed without problems in the swath deposit mode and in the chopping mode.

According to the invention, this object is achieved by the teaching of patent claim 1, features which develop the solution in an advantageous manner being presented in the further patent claims.

A harvester comprises a chassis, which can be moved across a field in a forward direction, and a crop processing device mounted in the latter, which threshes and separates the crop picked up from a front-mounted harvesting attachment. The straw threshed out, which is substantially free of grain, is ejected through an outlet of the crop processing device and taken over by a rotating ejector drum, which conveys it rearwards and discharges it in free flight. The ejector drum is followed by a further conveyor, which is embodied as a drum conveyor operating in an overshot manner. A guiding device, which consists of a single pivotable flap, is arranged downstream of the drum conveyor and can be moved between a chopping position, in which it deflects the straw downwards into the straw chopper, and a swath deposit position, in which it allows the straw through rearwards to a chute, which is arranged to the rear of the straw chopper and on which the straw is discharged unchopped onto the ground. The flap is pivotally mounted above the drum conveyor at its front end, the end adjacent to the drum conveyor, in such a way that it can be pivoted about an axis between the swath deposit position and the chopping position. The flap has a shape which is made complementary to the envelope curve of the drum conveyor and hugs said curve so that the flap is closely adjacent to an outer circumference of the drum conveyor.

By this means it is ensured that a single pivotable flap is sufficient to provide a switchable guiding device for the straw. (In contrast to the conveyor belt in U.S. Pat. No. 7,066,810 B), the drum conveyor has such a high straw discharge velocity that virtually all the straw is discharged rearwards to the chute in the swath deposit position, making a second pivotable flap for covering the straw chopper in swath deposit operation unnecessary. The shape of the flap is matched to the shape of the drum conveyor and deflects the straw in the respectively desired direction.

In a possible embodiment, the flap comprises an upper section which extends obliquely rearwards and downwards from the axis in the chopping position and a section which adjoins the upper section and extends vertically downwards in the chopping position. The sections are accordingly matched to the shape of the drum conveyor, although it should be noted that they do not have to extend exactly in the directions mentioned but that it is sufficient if they include a component which extends in the direction mentioned.

The flap preferably has a curved profile, i.e. a curved cross section, which can, in particular, be in the form of a circular arc.

The upper, upstream section of the flap preferably extends horizontally rearwards above the flow of straw in the swath deposit position, while the lower, downstream section then extends obliquely rearwards and downwards and deflects the straw downwards onto the chute.

The fact that, in the chopping position, the flap feeds the straw downwards into the inlet of the straw chopper and, in its swath deposit position, feeds it to the chute arranged to the rear of the straw chopper, which discharges it onto the ground to the rear of the straw chopper, makes it possible for a cleaning system to feed the crop residues discharged by it to the inlet of the straw chopper in swath deposit operation and in chopping operation, and this eliminates the expense of separate chaff spreaders.

ILLUSTRATIVE EMBODIMENT

Figure 2:
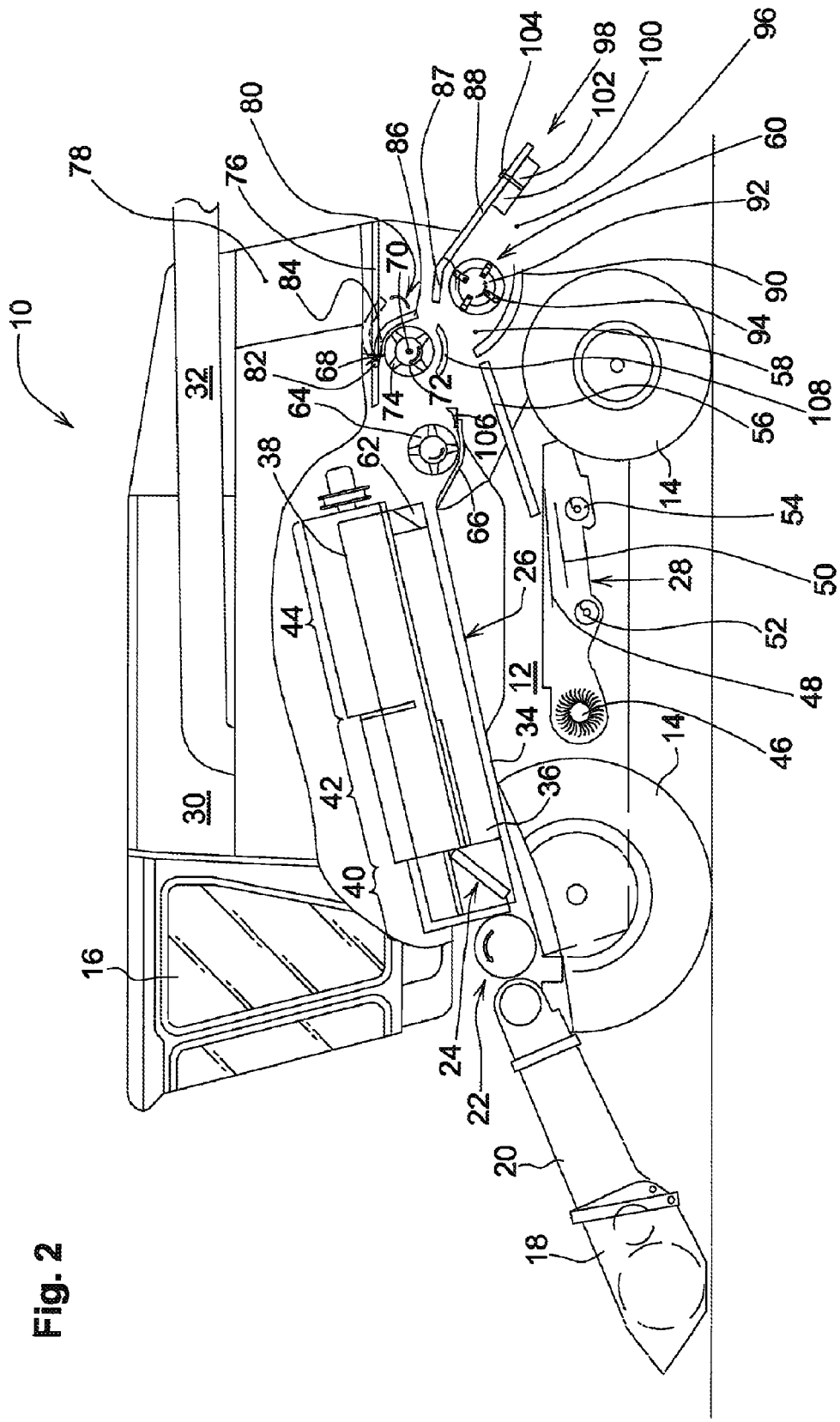

Two illustrative embodiments of the invention are explained with reference to the drawings, in which:

FIG. 1 shows a partially sectioned side view of a harvester with an additional drum conveyor for straw removal and a single flap for changing between swath deposit and chopping operation, and FIG. 2 shows a view of a second embodiment of the harvester.

FIG. 1 shows an agricultural harvester 10 with a chassis 12 having wheels 14, which are in contact with the ground, are attached to the chassis 12 and serve to drive the harvester 10 in a forward direction, which is to the left in FIG. 1. Operation of the harvester 10 is controlled from the operator's cab 16. A cutting section 18 is used to harvest a grain-containing crop and to feed it to a cross conveyor 20. The harvested material is fed by the cross conveyor 20 to a guide drum 22. The guide drum 22 guides the crop through an inlet transitional section 24 to an axial crop processing device 26. In the text which follows, directional terms such as front and rear relate to the forward direction of the harvester 10.

The crop processing device 26 comprises a rotor housing and a rotor 36 arranged therein. The rotor 36 comprises a hollow drum 38, to which processing elements for a feed section 40, a threshing section 42 and a separating section 44 are attached. The feed section 40 is arranged at the front of the axial crop processing unit 26. The threshing section 42 and the separating section 44 are situated longitudinally downstream and to the rear of the feed section 40. In the feed section 40, the drum 38 is frustoconical. The threshing section 42 comprises a frustoconical front section and a cylindrical rear section. The cylindrical separating section 44 of the drum 38 is situated at the end of the axial crop processing unit 26. An axial crop processing unit 26 can also be replaced by a tangential threshing drum and an axial separating device or straw walker following on from it.

Grain and chaff which fall through a concave associated with the threshing section 42 and through a separating grate associated with the separating section 44 are fed to a cleaning system 28 with a fan 46 and slotted sieves 48, 50, to which an oscillating motion can be imparted. The cleaning system 28 removes the chaff and feeds the clean grain to a clean grain elevator (not shown) by means of a screw conveyor 52. The clean-grain elevator deposits the clean grain in a grain tank 30. The clean grain in the grain tank 30 can be unloaded onto a grain wagon, trailer or truck by an unloading screw conveyor 32. Any remaining crop at the rear end of the lower slotted sieve 50 is fed back to the crop processing device 26 by means of a screw conveyor 54 and a tailings conveyor (not shown). The crop residues discharged at the rear end of the upper slotted sieve 48, which essentially comprise chaff and small pieces of straw, are conveyed rearwards into an inlet 58 of a straw chopper 60 by a vibratory pan conveyor 56.

Threshed straw leaving the separating section 44 is expelled from the crop processing device 26 through an outlet 62 and fed to an ejector drum 64. The ejector drum 64, which interacts with a pan 66 arranged underneath it, throws the straw out towards the rear. To the rear of the ejector drum 64 and approximately at the vertical level of its axis of rotation, there is a further conveyor in the form of a drum conveyor 68 operating in an overshot manner. The drum conveyor 68 extends horizontally and transversely to the forward direction and can be made to rotate by a drive about its axis 70, at which it is rotatably attached to the chassis 12, in a direction of rotation in which it operates in an overshot manner and rotates clockwise in FIG. 1, as indicated by the arrow. A hydraulic motor is generally used to drive the drum conveyor 68. In its construction, the drum conveyor 68 corresponds to the ejector drum 64 and comprises a rotationally symmetrical shell 72 with drivers 74 distributed around its circumference and rigidly attached to it.

An upper wall 76 extending horizontally and in the forward direction is mounted above the ejector drum 64 and the drum conveyor 68, closing off at the bottom an engine compartment 78 situated above it. A flap 80, which is provided as a guiding device used to switch between swath deposit operation and chopping operation and which forms the only element of the guiding device, is pivoted to the wall 76 at its front end, the end adjacent to the drum conveyor 68, in such a way that it can be pivoted about an axis 82 extending horizontally and transversely to the forward direction between a swath deposit position and a chopping position. In relation to the forward direction, the axis 82 is situated between the axis 70 of the drum conveyor 68 and the rear end of its envelope circle but could also be situated slightly behind it or in front of the axis 70. The flap 80 comprises an upper section 84, which, in the chopping position, in which the flap 80 is depicted in solid lines in FIG. 1, extends obliquely rearwards and downwards from the axis 82, and a section 86 which adjoins the upper section and extends vertically downwards in the chopping position. The sections 84, 86 are each flat per se and are connected to one another by an angled transition. The shape of the flap 80 is accordingly matched to the shape of the drum conveyor 68.

Underneath and adjoining the lower and rear end of the flap 80, without a gap (when the flap 80 is in the chopping position) is a plate 87, which is firmly connected to the chassis 12, extends obliquely rearwards and downwards and is connected to an adjoining chute 88, which extends parallel to the plate 87 and on which the straw can slide downwards onto the ground in swath deposit operation. The straw swath can also be given a desired shape by guide skids or straw guide rakes (not shown) mounted on the upper side of the chute 88. A plate 90 extending obliquely forwards and downwards and a vertical plate 92 are fitted in front of the plate 87, forming with the plate 87 a triangular profile and constituting an upper and front cover for the inlet 58 of the straw chopper 60.

The flap 80 can be pivoted about the axis 82 between the chopping position, in which it is depicted by solid lines in the figure, and a straw deposit position, in which the flap 80 is depicted by broken lines in the figure, and that region of the flap 80 which is upstream relative to the flow of residual crop material (i.e. its upper section 84) extends rearwards, parallel to the wall 76 above the flow of straw, while that region of the flap 80 which lies downstream of the flow of residual crop material (i.e. its lower section 86) extends obliquely rearwards and downwards above the chute 83 and deflects the flow of straw downwards onto the chute 88.

Situated underneath the plates 87, 90 is the straw chopper 60, which is made up of a housing 90 and a rotor 92, which is arranged therein, can be rotated about a horizontal axis extending transversely to the forward direction and has cutter blades 94 distributed around the circumference of the rotor 92 and mounted in such a way as to oscillate. The chute 88 forms an upper housing for the straw chopper 60. Two fans 98, of which only one can be seen in FIG. 1, are provided downstream of an outlet 96 of the straw chopper 60, said fans being arranged side by side below the chute 88. The fans 98 have a number of air blades 100, which are each connected rigidly to a shaft 102 extending orthogonally relative to the chute 88. The shaft 102 can be made to rotate by a hydraulic motor 104 in each case. In the swath deposit position, the straw chopper 60 conveys only the crop residues out of the cleaning system 28 to the fans 98, which distribute them on the ground approximately over the width of the cutting section 18. It is also possible to use a number of rigid or vibrating straw guide plates arranged side by side instead of the fans 98. The straw chopper 60 could furthermore be provided with an upper housing that is independent of the chute 88, and it would also be possible for the fans 98 to be fastened to this housing. A curved cover plate 108 is mounted underneath the drum conveyor 68.

For deposition of the straw in swath form (deposition of long straw), the flap 80 can be moved into its swath deposit position (depicted in broken lines), either manually by the operator using a suitable lever or from the operator's cab 16 by means of a power-operated drive (not shown). From the outlet 62 of the crop processing device 26, the straw is fed to the ejector drum 64, which throws it in free flight to the drum conveyor 68. The sideways distribution of the straw can be optimized by means of, preferably adjustable, guide skids 106 arranged downstream of the ejector drum 68. The drum conveyor 68 is operated in an overshot manner. As a result, the straw is actively thrown rearwards against the lower section 86 of the flap 80 and reaches the chute 76, on which it slides onto the ground. Owing to the relatively high speed that the drum conveyor 68 can reach, which ensures that almost all the straw is discharged rearwards onto the chute 88, there is no need for a further flap to cover the inlet 58 of the straw chopper 60 in swath deposit operation.

In the chopping position, the flap 80 is pivoted downwards about the axis 82 relative to the swath deposit position, as shown in FIG. 1. The straw thrown against the flap 80 by the drum conveyor 68 is deflected downwards by the flap 80 and falls downwards into the inlet 58 of the straw chopper 60, which chops it together with the crop residues from the cleaning system 28 and distributes it on the ground by means of the fans 98. The rear end of the flap (80) is situated below the axis 70 of the drum conveyor 68.

In the second embodiment shown in FIG. 2, those elements which correspond to the first embodiment are denoted by the same references. The significant difference which should be mentioned is that the flap 80 has a profile curved in the form of a circular arc, with the result that the upper section 84 merges continuously into the lower section 86. In the second embodiment, the plates 90 and 92 are furthermore omitted, and the front plate 87 situated ahead of the chute 88 is angled downwards and forwards relative to the chute 88. Moreover, the axis 82 is situated ahead of the axis 70 of the drum conveyor 68.

The invention claimed is:

1. A harvester (10) comprising:
   a chassis (12), which can be moved across a field in a forward direction,
   a crop processing device (26) having an outlet (62) for straw,
   a rotatable ejector drum (60), which is associated with the outlet (62) and discharges the straw rearwards in free flight,
   a straw chopper (60) with an inlet (58),
   a further conveyor for conveying straw, which operates in an overshot manner and is arranged downstream of the ejector drum (64),
   and a guiding device, which is arranged downstream of the further conveyor and upstream of the inlet (58) of the straw chopper (60) and which can be moved, by pivoting about an axis (82), into a chopping position, in which it deflects the straw downwards into the inlet (58) of the straw chopper (60), and a swath deposit position, in which it allows the straw to pass through to a chute (88), which is arranged to the rear of the straw chopper (60) and on which it reaches the ground,
   characterized in that the further conveyor is a drum conveyor (68),
   in that the guiding device comprises a single flap (80), the axis (82) of which is situated at its end of the flap (80) that is adjacent to the drum conveyor (68) and which is situated above the drum conveyor (68),
   and in that the flap (80) has a shape which is made complementary to an envelope curve of the drum conveyor (68) and hugs said curve.

2. The harvester (10) as claimed in claim 1, characterized in that the flap (80) has an upper section (84) which extends obliquely rearwards and downwards from the axis (82) in the chopping position and a section (86) which adjoins the upper section and extends vertically downwards in the chopping position.

3. The harvester (10) as claimed in claim 1, characterized in that the flap (80) has a curved profile.

4. The harvester (10) as claimed in claim 1, characterized in that the upper section (84) of the flap (80) extends horizontally rearwards above the flow of straw in the swath deposit position, while its lower section (86) then extends obliquely rearwards and downwards and deflects the straw downwards onto the chute (88).

5. The harvester (10) as claimed in claim 1, characterized in that the axis (82) is situated ahead of the axis (70) of the drum conveyor (68).

6. The harvester (10) as claimed in claim 1, characterized in that, in the chopping position, the downstream end of the flap (80) is situated below the axis (70) of the drum conveyor (68).

7. The harvester (10) as claimed in claim 1, characterized in that a cleaning system (28) feeds the crop residues discharged by it to the inlet (58) of the straw chopper (60) in swath deposit operation and in chopping operation.

* * * * *